US008617359B2

(12) United States Patent
Lehmann et al.

(10) Patent No.: US 8,617,359 B2
(45) Date of Patent: *Dec. 31, 2013

(54) METHOD FOR DISTILLING A STARTING MATERIAL AND INSTALLATION FOR CARRYING OUT SAID METHOD

(75) Inventors: Markus Lehmann, Wohlen (CH); Markus Braendli, Erlinsbach (CH)

(73) Assignee: Markus Lehmann, Wohlen (CH)

( * ) Notice: Subject to any disclaimer, the term of this patent is extended or adjusted under 35 U.S.C. 154(b) by 365 days.

This patent is subject to a terminal disclaimer.

(21) Appl. No.: 12/594,684

(22) PCT Filed: Apr. 1, 2008

(86) PCT No.: PCT/CH2008/000143
§ 371 (c)(1),
(2), (4) Date: Oct. 5, 2009

(87) PCT Pub. No.: WO2008/122136
PCT Pub. Date: Oct. 16, 2008

(65) Prior Publication Data
US 2010/0163398 A1  Jul. 1, 2010

(51) Int. Cl.
*B01D 1/16* (2006.01)
*B01D 3/10* (2006.01)
*B01D 3/42* (2006.01)
*B01D 5/00* (2006.01)

(52) U.S. Cl.
USPC  203/2; 159/48.1; 159/DIG. 15; 159/DIG. 16; 159/DIG. 28; 202/160; 202/172; 202/186; 202/205; 202/267.1; 203/25; 203/71; 203/86; 203/87; 203/90; 203/91; 203/DIG. 18

(58) Field of Classification Search
USPC ..... 159/48.1, 18, DIG. 15, DIG. 16, DIG. 28, 159/DIG. 32; 202/153–156, 160, 172, 188, 202/189, 186, 205, 236, 267.1, 269; 203/2, 203/25, 71, 86, 87, 90, 91, DIG. 14, DIG. 18
See application file for complete search history.

(56) References Cited

U.S. PATENT DOCUMENTS

| 3,218,241 A | 11/1965 | Checkovich |
| 4,053,368 A * | 10/1977 | Courvoisier et al. ........... 203/10 |
| 4,302,297 A * | 11/1981 | Humiston .................. 202/185.1 |
| 5,636,451 A * | 6/1997 | Bolcek et al. .................... 34/372 |
| 6,517,686 B2 * | 2/2003 | Borzio et al. ................. 202/160 |
| 7,431,805 B2 * | 10/2008 | Beckman .......................... 203/2 |
| 2003/0178294 A1* | 9/2003 | Braendli et al. ............. 202/205 |
| 2010/0115789 A1* | 5/2010 | Lehmann ........................ 34/470 |

FOREIGN PATENT DOCUMENTS

| DE | 10006036 A1 | 8/2000 |
| DE | 19940992 A1 | 3/2001 |
| DE | 10100666 A1 | 7/2002 |
| WO | WO02/09837 | 2/2002 |

OTHER PUBLICATIONS

European Patent Office Search Report, issued Jul. 2, 2008.
English translation of International Preliminary Examination Report on Patentability, issued Nov. 10, 2009.

* cited by examiner

*Primary Examiner* — Virginia Manoharan
(74) *Attorney, Agent, or Firm* — Dority & Manning, P.A.

(57) ABSTRACT

A method for distilling a starting material that includes a liquid Fd to be distilled, uses a gas-tight container system that is resistant to excess and/or negative pressure. The container system includes a condenser for condensing the liquid Fd, which has turned to vapor and whose temperature can be adjusted, to give the condensation product, and a vapor chamber connecting the evaporator and the condenser. The pressure and temperature in the vapor chamber are monitored and controlled so that distillation is always carried out in a range close to the saturation vapor pressure of the liquid Fd to be distilled. If the pressure is too high, it is reduced so that especially foreign gas is removed. An installation includes a container for distillation according to method.

25 Claims, 2 Drawing Sheets

METHOD FOR DISTILLING A STARTING MATERIAL AND INSTALLATION FOR CARRYING OUT SAID METHOD

CROSS-REFERENCE TO RELATED APPLICATIONS

This application claims priority to International Application Serial No. PCT/CH2008/000143 filed Apr. 1, 2008, which claims priority to Swiss Application No. CH547/07 filed Apr. 4, 2007.

TECHNICAL FIELD

The invention relates to a method for distilling a starting material, which comprises a liquid to be distilled, using a gas-tight container system that is resistant to excess and/or negative pressure, said container system comprising an evaporator with the starting material, the temperature of which can be adjusted, a condenser for condensing the liquid which has turned to vapor and the temperature of which can be adjusted to give the condensate as well as a vapor chamber connecting the evaporator and the condenser. Furthermore, the invention relates to an installation for carrying out such a method.

BACKGROUND

Distillation methods using such installations are suitable for the separation of liquids, which are mixed with further liquids and/or solids for example to give dispersions or emulsions and which are mutually soluble. One known application is alcohol distillation. In this case, the liquid to be distilled is alcohol, in many other applications it is water.

Mostly, known methods use complex devices as condensers, comprising interconnected piping systems such as are known from the distillation of alcohol. On the one hand, such systems have the disadvantage of a complex assembly of apparatuses, and on the other hand the requirement of a high temperature difference between the starting material and the condenser, which is necessary to achieve a sufficient yield of the method. The achievement of such a high temperature difference is very expensive.

It has been shown that the efficiency of the distillation method may be improved if the vapor chamber is free from foreign gas as much as possible. In WO 02/09837, a distillation installation is described, in which foreign gas has to be removed from the vapor chamber. This is achieved by means of a vacuum pump with high performance and long operation times which sucks off the medium from the bath. Unfortunately, by using this method a huge amount of vapor is sucked off together with the condensate. On the one hand, this unnecessarily affects the pump, and on the other hand very much condensate is sucked off by said permanent suction, which then is no longer available for the recovery of energy.

In EP 0563628 another distillation installation is presented, which generates a suction action by means of a continuously operating vacuum pump in the condenser, to suck off the vapors from the evaporator to the condenser. On the one hand, this method also needs much operation energy, on the other hand the condensate is also sucked off from the vapor chamber here, whereby additionally energy is lost in the form of heat.

DESCRIPTION OF THE PRESENT INVENTION

The object of the present invention is to provide a low-energy distillation method which achieves a large yield already at a small temperature difference. Furthermore, a cheap transportable installation is provided, which is suitable to carry out said method.

The object is solved by a method as well as by an installation described in more detail below.

The idea underlying the present invention is based on the fact that the method is carried out in an ideal pressure-temperature range, in which on the one hand the process of distillation is done in an optimal manner, and in which on the other hand no energy is wasted by sucking off useful vapor from the vapor chamber.

For this purpose, the pressure in the vapor chamber has to be continuously monitored and to be compared with the saturation vapor pressure determined in the vapor chamber at the actual temperature. Ideally, the pressure is in a close range just above the saturation vapor pressure. As soon as foreign gas intrudes, the pressure increases and the process proceeds suboptimally. Then, on the one hand, gas has to be sucked off so that the process is allowed to continue in the optimal pressure range, on the other hand the foreign gas has to be sucked off in a targeted manner. This is achieved in that the suction is carried out at the end of the condensation pathway, since there the foreign gas accumulates. During suction, the pressure has to be further monitored. It is not allowed to decrease below saturation vapor pressure, since otherwise the optimal conditions are again not met. For this purpose, the suction has to be stopped in advance, as long as the pressure is just above the saturation vapor pressure. In this state, a small tolerable residual amount of foreign gas is in the vapor chamber, and the process proceeds optimally. As long as no foreign gas invades into the vapor chamber and as long as the temperature in the condenser is lower than in the evaporator, the process continues in a very efficient manner, without corrections being required, in particular without pumping.

Thus, a high requirement is made to the high degree of tightness of the installation. In order to save laborious efforts in searching small leaks, all critical sites, in particular the regions of flanges, pumps etc. may be flooded with the condensate as a precaution. In the case of a leakage, some condensate thereby invades into the container, which does not affect the process in any way.

The performance of the distillation installation with said process of the present invention is optimal with a small energy expenditure. Furthermore, the temperature difference between evaporator and condenser may be kept small, which might be another economic advantage for many applications, in which waste heat of power plants may be used.

Further advantageous embodiments are obvious from what is described below.

A further idea of the present invention is based on the fact that the distillation installation is accommodated in a container, preferably an ISO container of the present invention. Such containers are economically available, are very suitable for transport and are available in tight (free of leakage) embodiments.

SHORT DESCRIPTION OF THE DRAWINGS

In the following the invention is illustrated in more detail with respect to the drawings.

DETAILED DESCRIPTION OF EXEMPLARY EMBODIMENTS

Figure 1:
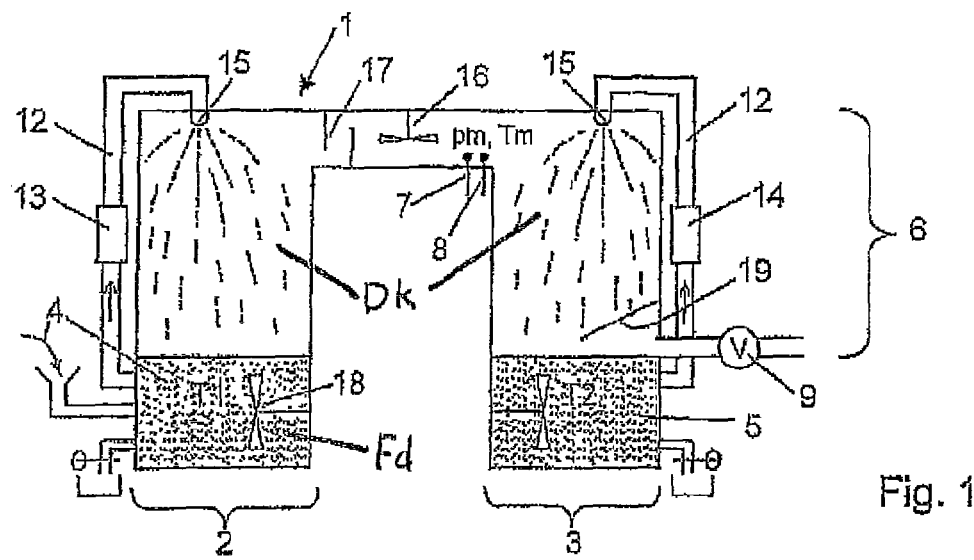
FIG. 1 shows a schematic illustration of a distillation installation of the present invention.

FIG. 1 shows a simple embodiment of a distillation installation of the present invention. It comprises a container system 1, which is divided into the following regions of evaporator 2, condenser 3 and vapor chamber 6, wherein the container system 1 has to be resistant to excessive and/or negative pressure. In evaporator 2 is the starting material 4, which comprises the liquid to be distilled Fd and the temperature of which may be adjusted. The condenser 3 accommodates the condensate 5, the temperature of which may also be adjusted and which is generated by distillation following condensation. The temperature of the starting material 4 as well as of the condensate 5 may also be adjusted outside of the container system 1.

The vapor chamber 6 connects the evaporator 2 with the condenser 3. It is filled with the vapor to be condensed Dk. Said vapor Dk is generated by evaporation of the liquid Ed to be distilled from the evaporator 2. The vapor chamber 6 is provided with a pressure sensor 7 for measuring the mixed pressure pm adjusted in the vapor chamber 6, with a temperature sensor 8 for measuring the mixed temperature Tm adjusted in the vapor chamber 6, as well as with a pressure regulator 9 for adjusting, in particular reducing the mixed pressure pm in the vapor chamber 6.

For carrying out the distillation the evaporator 2 with the starting material 4 is first brought to a first temperature T1 and the condenser 3 to a second lower temperature T2. Subsequently, the mixed pressure pm and the mixed temperature Tm is measured. From the measured mixed temperature Tm the saturation vapor pressure ps of the liquid Fd having the temperature Tm can be determined.

The saturation vapor pressure is a characteristic of a liquid. It describes the vapor pressure which is maximal at a specific temperature and is often abbreviated as vapor pressure. For example, from pure liquids atoms/molecules escape into the gas phase until a pressure is established which is dependent from the material type and the equilibrium temperature. Said pressure is the saturation vapor pressure. Said pressure prevails when the gas is in a thermodynamic equilibrium with the liquid. In this state, the evaporation of the liquid quantitatively equals the condensation of the gas. At the bottom line, none of the phases grows at the expense of the other, whereby both may simultaneously exist in a stable manner. This is also referred to as a dynamic equilibrium.

Figure 2:
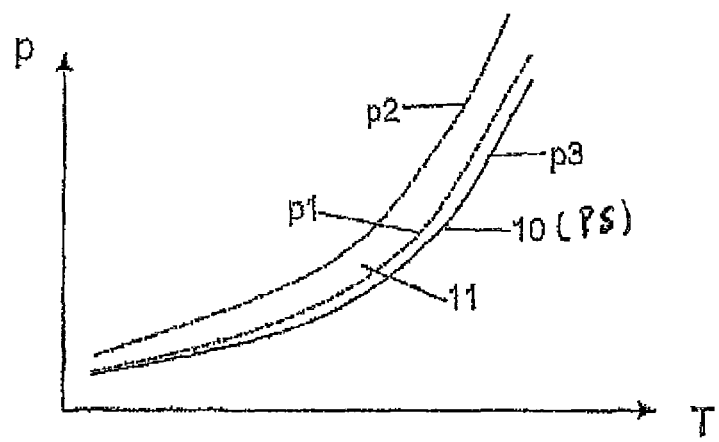
FIG. 2 shows a pressure vs. temperature graph with the saturation vapor pressure of the liquid to be distilled.

In FIG. 2, an example of a saturation pressure curve 10 of a material is provided as a function of a pressure vs. the temperature, wherein the liquid phase of the material is present in the left top region and the gaseous phase in the right bottom region of the curve. The phase change takes place in the region of the saturation vapor pressure curve 10. Saturation vapor pressure curves of common materials are known and can be looked up in manuals or may be interpolated via formulae.

Following the determination of the saturation vapor pressure ps a set pressure range 11 is determined. Preferably, the mixed pressure pm in the vapor chamber 6 should be in this set pressure range 11 at the corresponding mixed temperature Tm, so that the distillation is done in an optimal manner, i.e. with as little energy and as efficient as possible.

The set pressure range 11 is just above the saturation vapor pressure curve since it includes the quantity of pressure-increasing foreign gas. It is limited by a lower pressure limit p1 and an upper pressure limit p2, such as is illustrated in FIG. 2. The lower pressure limit p1 theoretically corresponds to the saturation vapor pressure ps, however, due to practical reasons for control it is adjusted to at least 0.1% above the saturation vapor pressure ps. The upper pressure limit p2 is at the most 6% above the saturation vapor pressure ps.

Initially, the mixed pressure pm is compared with the set pressure range 11. At the beginning of the process the mixed pressure is far above the set pressure range 11. In this case the pressure in the vapor chamber 6 is reduced exactly until the mixed pressure pm has reached the lower pressure limit p1. Preferably, this is done with the pressure regulator 9 which may be a pump. As soon as the pressure limit p1 has been reached, the pressure regulator 9 is stopped.

Now, the distillation continues autonomously as long as the starting material 4 in the condenser has a temperature T1 which is higher than the mixed temperature Tm. Since the gas tends to be in a thermodynamic equilibrium with the liquid the evaporation of the liquid to be distilled Fd is promoted. Since again a thermodynamic equilibrium is aspired, the condensation is promoted as long as the temperature T2 of the condenser is lower than the mixed temperature Tm.

As long as the mixed pressure pm does not exceed the pressure limit p2, the intended mixed pressure which is optimal for the process is automatically established without intervention of the pressure regulator 9 also with changes of the temperature of the medium to be evaporated or to be condensed.

During the operation of the distillation the mixed temperature Tm and the mixed pressure pm are continuously monitored until the mixed pressure pm has reached the upper pressure limit p2. The pressure may increase since e.g. the container system 1 or another component of the installation exhibit a small leakage, whereby foreign gas may be introduced into the vapor chamber 6 or since foreign gases may have been released from other materials of the installation or from the starting material 4. As soon as the mixed pressure pm has reached or exceeded the upper pressure limit p2, the pressure in the vapor chamber 6 is again reduced by starting the pressure regulator or the pump 9, respectively. As soon as the mixed pressure pm has reached the lower pressure limit p1, the pressure regulator 9 may be stopped again. Now, the distillation again is carried out with optimal parameters. Said procedures may be continued as long as the mixture to be distilled can be fed and condensate can be discharged.

The quality of the condensation significantly depends on the foreign gas proportion. A foreign gas proportion in the vapor chamber of a few per mils may already reduce the condensation by 20 to 50%. Thus, the mixed pressure is continuously monitored and compared with the set pressure range 11.

It has been found out that foreign gas accumulates at the end of the condensation pathway, since it is flushed by the gas flow flowing from starting material 4 through the vapor chamber 6 to the condensate 5 but finally cannot become condensate. Therefore, it is advantageous to suck off the vapor at the end of the condensation pathway in the condenser 3 directly at the condensate 5. Thus, in the course of reducing the mixed pressure pm the highest concentration of foreign gas can be removed from the container system 1. On the other hand, it has to be insured, that the condensate dropping down does not get directly into the intake flow of the pressure regulator or the pump 9, respectively. This may be achieved by a protection panel 19.

The set pressure range 11 should not be too close to the saturation vapor pressure curve 10, since otherwise during the reduction of the mixed pressure pm an excess of the vapor to be condensed Dk is sucked off by pump 9. It has proven advantageous to select the lower pressure limit p1 preferably at least 0.2% and the upper pressure limit p2 preferably at most 4% above the saturation vapor pressure ps. In contrast to conventional distillation methods, the method according to the present invention continuously monitors the prevailing mixed pressure pm in vapor chamber 6 and compares it with the set pressure range 11, to appropriately control the mixed pressure pm if necessary. Mostly, conventional methods continuously suck off gas from the vapor chamber and thus work in a pressure range which is below the saturation vapor pressure ps, whereby on the one hand a high amount of energy has to be spent and otherwise a high amount of the energetically useful condensate is unnecessarily removed from the vapor chamber. In contrast, the present method most of the time works without any vacuum pump, since it has to be switched on only temporarily and only for a short time.

The temperature difference T1-T2 between evaporator 2 and condenser 3 may be selected particularly small with this method according to the invention and is preferably between 1K and 10K, ideally between 1K and 3K. This is an enormous energetic advantage, since thus only little energy has to be spent for generating the temperature difference.

The evaporation and/or the condensation may be promoted by enlarging the surfaces of the starting material 4 in the evaporator 2 and/or the surface of the condensate 5 in the condenser 3. For example, a surface enlargement may be achieved by fine spraying the starting material 4 or the condensate 5, respectively. A fine die arranged for this purpose of a spraying unit 15 in the evaporator 2 and/or condenser 3 can generate a surface of several square meters in every second, at which surface the vapor is generated or the vapor to be condensed Dk may condense, respectively. More advantageously, the spraying is arranged in a particular direction, so that an optimal mixing of the vapor in vapor chamber 6 is achieved. This is important to achieve an as high as possible heat transfer between starting material 4 and the vapor in vapor chamber 6. Thereby, the efficiency is promoted and the mixed temperature Tm may be determined in a reliable manner. Otherwise or additionally a ventilator 16 may be arranged in the vapor chamber 6 to achieve the desired mixing of the vapor. A heating unit 13 in the region of feed lines 12 to the spraying unit 15 on the side of the evaporator 2 and a cooling unit 14 in the region of feed lines 12 of spraying unit 15 on the side of condenser 3 provide the achievement of the set temperatures T1 and T2 in evaporator 2 and in condenser 3. Of course, the temperature regulating units 13 and 14 may also be directly arranged in starting material 4 and in condensate 5.

The surface enlargement may also be achieved by introducing a surface enlarging porous filling package into the evaporator 2 and/or into the condenser 3. These enable a maximum temperature equalization between mixed vapor and the condensate in the condenser.

Another preferred embodiment comprises one or more panels 17 or a drop-separating filling, which prevent drops of the sprayed starting material 4 from directly getting into the condenser 3. In contrast, no drops of the condensate 5 should get into the evaporator 2. Furthermore, mixers 18 can mix the starting material 4 and/or the condensate 5 to keep the surface temperatures thereof constant.

Figure 3:
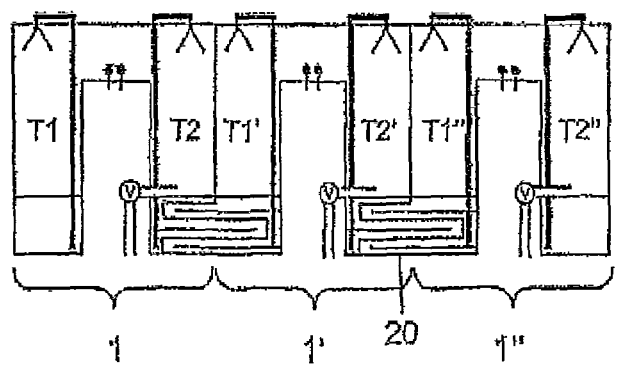
FIG. 3 shows a schematic illustration of an arrangement of several distillation installations of the present invention.

In FIG. 3 an installation is shown with a further improvement of the efficiency. The improvement is achieved by gradually carrying out the method in 2 or more of such container systems 1, 1', 1". Each container system 1, 1', 1" runs in another temperature range (T1, T2), (T1', T2'), (T1", T2"). The temperature ranges of the individual container systems 1, 1', 1" differ from each other, preferably they are adjacent to each other. In a first container system 1 the method is carried out e.g. with temperatures T1=90° C. and T2=80° C., wherein a mixed temperature in the vapor chamber of e.g. 85° C. is established. In the second container system 1' the temperatures T1'=80° C. and T2'=70° C. are then adjusted, in the third container system 1" the temperatures T1"=70° C. and T2"=60° C. etc, and in the last container system 1''' the temperatures T1'''=40° C. and T2'''=30° C., for example.

Preferably, the energy for adjusting the temperature of an evaporator 2 or condenser 3 is attained at least in part directly or indirectly via heat exchangers from the energy of another evaporator 2 or condenser 3, the temperature of which is to be altered.

In order to save energy the release of foreign gas can be carried out by means of a vacuum jet pump, which is operated either with the condensate 5 to be sprayed from the same or a cooler stage, with vapor of another stage or with ambient air.

With such an arrangement, this may simply be achieved by arranging e.g. a heat exchanger 20 between a condensate 5 and a starting material 4 of a subsequent container system 1 or a series of preceding stages, if they shall have the same temperatures. For this purpose, plate heat exchangers are preferably used.

The evaporator 2 and/or condenser 3 of the different container systems 1, 1', ... may in particular be arranged on top of each other. Particularly suitable is a horizontal arrangement of the condensers and a vertical arrangement of the evaporators. The necessary connections between single container components are in each case achieved with vapor pipes. The advantage resides in particular in the low-energy method of distillation, since the energy may be used in an optimal manner. The heat exchangers used may be arranged inside or outside of the container system 1. Above all, reasons for the external arrangement are a better accessibility for cleaning the heat exchangers. As a heat exchanger, in particular plate heat exchangers or pipe bundles are suitable.

In order to keep not only the operational costs but also the purchase costs low, the container systems 1 and/or other components of the installation, e.g. the piping are preferably prepared completely or essentially from cheap plastics.

Preferably, the container system 1 has to be resistant to excessive pressure or negative pressure, not both. This enables a cheap assembly of container system 1. For example, it can consist of a technical plastic film, which is supported at a solid frame which is arranged inside or outside of the film. There is no need for the negative pressures to be intense. For water the absolute vapor saturation pressure is still 123 mbar (relative −877 mbar) at 50° C. Therefore, the tear resistance requirement of the film is still in a range, in which the materials are available at reasonable costs.

If temperatures above 100° C. are employed, an excessive pressure in container system 1 has to be generated, to get started the distillation according to the present invention. In this case the frame has to be arranged outside the film. In this case, the pressure regulator 9 is a valve which can release gas from the vapor chamber into the environment, when the pressure has to be decreased. The excessive pressure may be generated by a pump or by heating.

The container system has to be simultaneously resistant to excessive and negative pressure only if the operation takes place in a range around normal pressure, i.e. in the case of water in the range of 100°.

The method may be carried out batch-wise or continuously. FIG. 1 schematically illustrates the inflow and outflow to fill and discharge the installation Important for the described method is the exact meeting of the required temperature-pressure relationships. In the ideal condition i.e. when the installation does not exhibit any leakage and there is only a small and allowed amount of foreign gas in the vapor chamber, the pressure regulator 9 does not have to be switched on at all following starting of the process. Once established, the distillation process works autonomously as long as the process parameters remain in the predetermined region, i.e. as long as there is a temperature gradient between T1 and T2. In the case that the installation practically has no leakage, the pressure regulator 9 at most has to work at 1-5% of the entire distillation period. With little minor leakages, operation periods of the pressure regulator 9 between 3% and 50% of the operation period have to be anticipated.

One serious problem of leakage is the invasion of foreign gas. Tightness of the installation is of high importance, since primarily already a slightly increased proportion of foreign gas is responsible for a seriously decreased efficiency of the installation. It has been found, that commercially available qualities of pumps, pipe joints, flanges and other components are not sufficient to operate in a leakage-free manner, as it is required herein. Even high quality components are still not sufficient in this respect, to meet the requirements. Furthermore, it may be time consuming and expensive to find a leakage. In order to prevent leakages all components which have pressure relevant connections and joints may be flooded. Said components comprise parts of the walls of evaporator 2 and condenser 3, at which flanges are arranged as well as all components such as pumps, sensors, valves, in- and outflows and other flanges. Even the entire installation may be flooded.

Preferably, the flooding is done with the medium corresponding to the condensate 5. The flooding ensures that no foreign gas can enter at any of the leaky sites, but only condensate. This doesn't disrupt the process in any way, it is not even determinable. By said flooding, a continuous control of the installation for tightness becomes unnecessary, which may be very laborious.

The only energy which has to be necessarily spent for the process is the one for generating the different temperatures T1 and T2 as well as for maintaining a temperature difference and if the yield has to be increased the energy for the transportation of the liquids to the spraying units for the purpose of increasing the surfaces.

A significant difference between the method according to the present invention and the prior art is the controlled suction of foreign gas. The described pressure reduction is done at the end of the condensation pathway to not only reduce the pressure but also to remove the foreign gas. In contrast to known methods the suction is done only until the foreign gas proportion is decreased under a certain limit value. This is monitored by comparison of the prevailing mixed pressure pm with the saturation vapor pressure ps determined at the prevailing mixed temperature Tm. If the mixed pressure pm has reached a specific limit value, e.g. 0.1% above the saturation vapor pressure ps, the suction is stopped, in order to prevent the process from operating worse. On the one hand, the efficiency of the process will not improve with a lower pressure, on the other hand, the suction unnecessarily needs energy and further the vapor is removed from the system, the energy of which can no longer be used in a later stage. Therefore, the process is optimal only in a narrow pressure-temperature range which always has to be maintained in order to carry out the method in an energy-efficient manner.

Preferably, the described process is carried out in a container, in particular in an ISO container (20 or 40 feet standard container), in which the installation is accommodated and which may be a part of the installation. Thus, the transport from the production location to the operation location of the installation may be achieved simply and cheaply by container ship or truck. Further, this simplifies the maintenance, since if the distillation is done at a place remote from the civil population the container again can be easily brought to a maintenance place on a truck.

Figure 4:
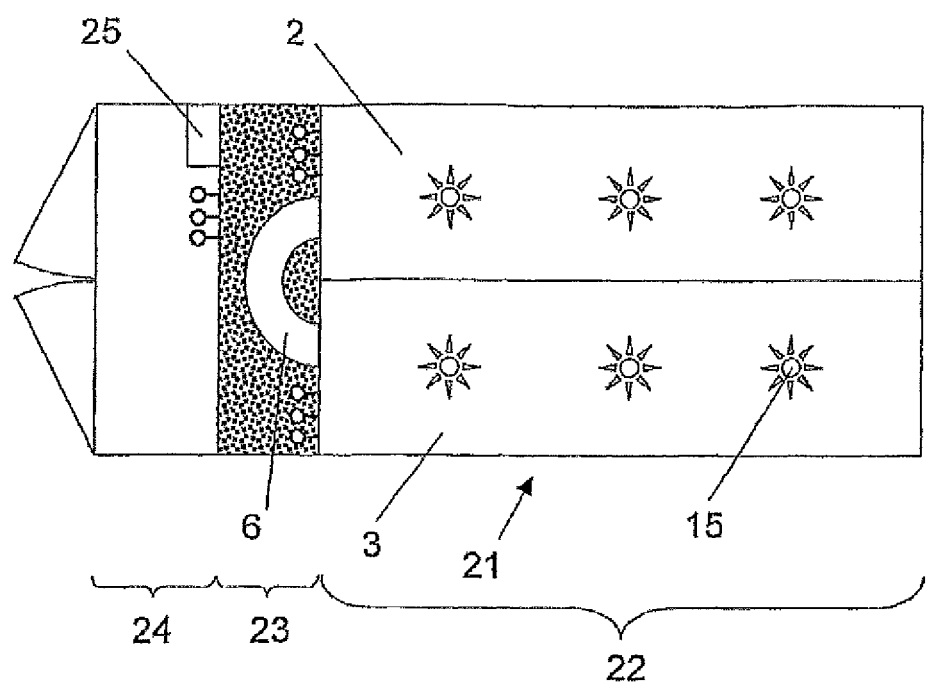
FIG. 4 shows a schematic illustration in a top view of a distillation installation of the present invention in a container.

The distillation installation described in FIG. 4 comprises a container system 1 each having a condenser 3, an evaporator 2 and a vapor chamber 6 connecting said evaporator 2 with said condenser 3 for distilling a starting material 4 according to one of the methods described above. Said distillation installation is placed in a container 21, in particular an ISO container 21. Preferably, parts of the container 21, e.g. walls, simultaneously act as parts of the container system 1. Thus, the distillation installation is accommodated in container 21. Such containers 21 are cheaply available and are highly standardized. Furthermore, leakage-free containers 21 are available which meet the demands described hereinbefore. Evaporator 2 and condenser 3 may be separately placed in different containers 21, connected by a vapor chamber 6 which is attached thereto in a connecting manner, or they may share a container 21, such as it is illustrated in FIG. 4. In one container 21, several independent evaporators 2 and/or condensers 3 for different pressure and temperature stages may be placed and connected with each other in a manner appropriate for the process.

In the arrangement of FIG. 4 the container 21 has a reactor region 22 in which evaporator (2) and condenser (3) are located, a flooded region 23, in which pressure relevant components, such as pumps, valves, sensors and flanges are located, as well as a service region 24 for electronic components 25, which are not flooded. Said service region 24 is accessible for operation and maintenance of the installation.

The arrangements within container 21 may also be established alternatively. In particular, the vapor chamber 6 may be formed directly in a separation wall between evaporator 2 and condenser 3 by openings or ducts. The flooded region 23 with the connections may also be arranged in the upper region of container 21. As a further alternative, evaporator 2 and condenser 3 may also be positioned on top of each other. According to the present invention, for distillation installations with higher capacities also several containers may be arranged on top of each other or side by side, which are connected with each other.

LIST OF REFERENCE SYMBOLS 1 container system
2 evaporator
3 condenser
4 starting material
5 condensate
6 vapor chamber
7 pressure sensor
8 temperature sensor
9 regulator (pump and/or valve)
10 vapor pressure curve
11 set pressure range
12 piping
13 heating
14 cooling
15 spraying unit
16 ventilator
17 panels
18 mixer
19 protecting panel
20 heat exchanger
21 container 22 reactor region
23 flooded region
24 service region
25 electronic components
pm mixed pressure in the vapor chamber
ps saturation vapor pressure
Tm mixed temperature in the vapor chamber
T1 temperature in the evaporator
T2 temperature in the condenser
Fd liquid to be distilled
Dk vapor to be condensed
V pump and/or valve for regulating the pressure

The invention claimed is:

1. A method for distilling a starting material, which consists of a liquid to be distilled Fd, using a gas-tight container system that is resistant to excess and/or negative pressure, said container system comprising an evaporator with the liquid starting material the temperature of which can be adjusted, a condenser for condensing the liquid Fd which has turned to vapor and the temperature of which can be adjusted to give the condensate, as well as a vapor chamber connecting the evaporator and the condenser, the condenser having a condensation pathway with an end thereof, the temperature in the vapor chamber being the mixed temperature (Tm) and the pressure in the vapor chamber being the mixed pressure (pm) wherein the vapor chamber is provided with a pressure sensor for measuring the mixed pressure pm established therein, wherein the vapor chamber is provided with a temperature sensor for measuring the mixed temperature Tm established therein and a pressure regulator, the method comprising the following process steps:
   a) the evaporator with the liquid starting material is brought to a first temperature T1, and the condenser to a second lower temperature T2;
   b) the mixed pressure pm and the mixed temperature Tm are measured;
   c) the saturation vapor pressure ps of the liquid starting material at the measured mixed temperature Tm is determined;
   d) a set-pressure range is determined, which is limited by a lower pressure limit p1, which is at least 0.1% above the saturation vapor pressure ps and an upper pressure limit p2, which is at the most 6% above the saturation vapor pressure ps;
   e) the mixed pressure pm is compared with the set-pressure range;
   f) the mixed pressure pm is reduced by the pressure regulator exactly until it has reached the lower pressure limit p1 by sucking off gases at the end of the condensation pathway in the condenser to remove foreign gas from the container system;
   g) the steps a) to e) are repeated, until the mixed pressure pm has reached the upper pressure limit p2;
   h) the steps f) and g) are repeated until the distillation is to be stopped.

2. The method according to claim 1, wherein the lower pressure limit p1 is at least 0.2% above the saturation vapor pressure ps and the upper pressure limit p2 is at the most 4% above the saturation vapor pressure ps.

3. The method according to claim 1, wherein the temperature difference T1-T2 between the evaporator and the condenser is between 1 and 3K.

4. The method according to claim 1, wherein the surfaces of the starting material in the evaporator and/or the surface of the condensate in the condenser are enlarged.

5. The method according to claim 4, wherein the surface enlargement is achieved by spraying the starting material and/or the condensate.

6. The method according to claim 5, wherein the spraying is done in a specific direction to enhance heat transfer between the starting material and the vapor in the vapor chamber.

7. The method according to claim 4, wherein the surface enlargement is achieved by introducing a surface-enlarging porous filling package.

8. The method according to claim 5, further comprising at least one panel that prevents drops from the sprayed starting material directly getting into the condenser.

9. The method according to claim 1, wherein the vapor distribution in the vapor chamber is mixed.

10. The method according to claim 9, wherein the mixing of the vapor distribution in the vapor chamber is done by operation of a ventilator acting on the sprayed mass flow of the medium to be evaporated or the condensate sprayed.

11. The method according to claim 5, wherein a vacuum jet pump is the pressure regulator that is used to perform the release of foreign gas in step f).

12. The method according to claim 1, wherein the mixers mix the starting material and/or the condensate to keep the surface temperature constant.

13. The method according to claim 1, wherein the method is carried out in 2 or more of such container systems wherein the temperature ranges T1, T2 of the individual container systems are adjacent to each other.

14. The method according to claim 13, wherein the energy for heating of an evaporator is obtained at least in part directly or indirectly via heat exchangers from the energy of another evaporator or condenser, the temperature of which has to be altered.

15. The method according to claim 13, wherein a heat exchanger between the condensate of a first container system and the starting material of another container system adjusts the temperatures thereof to each other.

16. The method according to claim 13, wherein the evaporator and the condenser of each of the different container systems is arranged on top of each other.

17. The method according to claim 1, wherein the distillation is carried out in a container system with internal piping, and the container system and/or the piping consist essentially of plastics.

18. The method according to claim 1, wherein a member that is to be flooded to prevent foreign gas leakage is selected from the group consisting of walls of the evaporator, walls of the condenser, pumps, valves, sensors, and flanges.

19. The method according to claim 1, wherein the pressure regulator in step f) operates at the most at 50% of the distillation period.

20. The method according to claim 1, wherein the distillation is carried out in an ISO container.

21. A distillation installation for distilling a starting material that includes a liquid to be distilled, the installation comprising:
   an International Organization for Standardization (ISO) container system having an ISO container in which is housed a condenser having a condensation pathway with an end thereof directly at the condensate and a temperature regulating unit for adjusting the temperature of the condensate, an evaporator having a temperature regulating unit for adjusting the temperature of the starting material, and a vapor chamber connecting the evaporator and the condenser and configured to allow pressure equilibrium that includes a mixed pressure pm between the evaporator and the condenser;

a pressure sensor disposed in the vapor chamber for measuring the mixed pressure pm established therein;

a temperature sensor disposed in the vapor chamber for measuring the mixed temperature Tm established therein; and a pressure regulator disposed to suck off gases at the end of the condensation pathway in the condenser directly at the condensate by reducing the mixed pressure pm of the vapor chamber.

22. The distillation installation according to claim 21, wherein the distillation installation is integrated into the ISO container in such a manner, that walls of the container act as parts of the container system.

23. A distillation installation for distilling a starting material that includes a liquid to be distilled, the installation comprising:

an International Organization for Standardization (ISO) container system having an ISO container in which is housed a condenser having a condensation pathway with an end thereof and a temperature control for adjusting the temperature of the condensate, an evaporator having a temperature control for adjusting the temperature of the starting material, and a vapor chamber connecting the evaporator and the condenser and configured to allow pressure equilibrium between the evaporator and the condenser;

a pressure sensor disposed in the vapor chamber for measuring the mixed pressure pm established therein;

a temperature sensor disposed in the vapor chamber for measuring the mixed temperature Tm established therein; and a pressure regulator disposed to suck off gases at the end of the condensation pathway in the condenser;

wherein the container has a reactor region in which the evaporator and the condenser are accommodated, a flooded region in which are located at least one of the following pressure relevant components that include a pump, a valve, a sensor and a connecting flange, and a service region for electronic components which is accessible for operation and maintenance of the installation.

24. The distillation installation according to claim 21, further comprising a second container connected to the ISO container, wherein the second container houses a second condenser, a second evaporator, and a second vapor chamber connecting the second evaporator and the second condenser and wherein the second vapor chamber is provided with a second pressure sensor for measuring the mixed pressure pm established therein, a second temperature sensor for measuring the mixed temperature Tm established therein and a second pressure regulator.

25. The distillation installation according to claim 21, wherein in one container several evaporators and condensers of different pressure and temperature stages are arranged and are connected with each other.

* * * * *